United States Patent [19]

Yamada et al.

[11] Patent Number: 5,104,476
[45] Date of Patent: Apr. 14, 1992

[54] ADHESION METHOD FOR RUBBER ARTICLES

[75] Inventors: Tomoharu Yamada, Musahino; Ryota Fujio, Akigawa, both of Japan

[73] Assignee: Bridgestone Corporation, Tokyo, Japan

[21] Appl. No.: 496,715

[22] Filed: Mar. 21, 1990

[30] Foreign Application Priority Data

Mar. 24, 1989 [JP] Japan .................................. 1-70421

[51] Int. Cl.$^5$ .............................................. C09J 5/10
[52] U.S. Cl. .................................. 156/306.9; 156/96; 156/307.5; 156/334; 156/338; 428/493; 428/519; 525/332.7
[58] Field of Search ................. 156/306.9, 307.5, 334, 156/338, 96; 428/493, 519; 525/332.7

[56] References Cited

U.S. PATENT DOCUMENTS

| | | | |
|---|---|---|---|
| 2,625,980 | 1/1953 | Castricum | 156/132 |
| 2,976,910 | 3/1961 | Nowak | 156/338 |
| 3,296,061 | 1/1967 | Tavenor et al. | 428/493 |

FOREIGN PATENT DOCUMENTS 2072575  4/1980  United Kingdom .

OTHER PUBLICATIONS

Database WPI, abs. No. 79-91854b, Derwent Publications Ltd., London, GB; & JP-A-54144485 (Ohij Gum Kasei KK) Oct. 11, 1979, Abstract only.
Database WPIL, abs. No. 84-084531, Derwent Publications Ltd., London, GB; & JP-A-59033375 (Mitsuboshi Belting KK) Feb. 23, 1984, Abstract only.
Database WPI, abs, No. 74-53105v. Derwent Publications Ltd., London, GB; & JP-B-49024972 (Mitsuboshi Belting LTD.) Jun. 26, 1974, Abstract only.

*Primary Examiner*—John J. Gallagher
*Attorney, Agent, or Firm*—Sughrue, Mion, Zinn Macpeak & Seas

[57] ABSTRACT

Two vulcanizates are adhered to each other by (I) applying a particular rubber cement composition to surfaces of the vulcanizates to be adhered and drying it; and (II) sandwiching an unvulcanized rubber sheet of a particular cushion rubber composition between the applied surfaces of the vulcanizates and fulcanizing them at a temperature of 0°–100° C. under pressure.

5 Claims, No Drawings

ADHESION METHOD FOR RUBBER ARTICLES

BACKGROUND OF THE INVENTION

1. Field of the Invention

This invention relates to a method of adhering rubber articles, and more particularly to an adhesion method for rubber articles which is suitable for the adhesion of vulcanized rubber articles at a low temperature of not higher than 100° C, preferably not higher than 50° C., such as retreading adhesion of tires, repair the broken-off portion in tires, conveyor belts and the like, and forming numerous conveyor belts and so on.

2. Related Art Statement

At the present, the retreading adhesion of tires is carried out by a precure system. That is, a rubber cement is applied to a surface of each of a base tire and a precure tread to be adhered, and a cushion rubber is sandwiched between these surfaces covered with the rubber cement, and then these members are bonded by vulcanization at a high temperature of not lower than 120° C., usually about 150° C. However, such a system has the following problems:

(1) It is necessary to conduct the vulcanization in an autoclave at a high temperature under a high pressure, so that it is required to use large-size equipment;

(2) Since the vulcanized base tire and tread are again exposed to a high temperature exceeding 120° C., the properties and performances of these members may be degraded.

Therefore, it is strongly demanded to develop a method of adhesion through vulcanization at a temperature of not higher than 100° C., preferably not higher than 50° C.

On the other hand, a method of adhering vulcanized rubber articles through vulcanization at a temperature of not higher than 100° C. is disclosed in Japanese Patent Application Publication No. 49-24972 and the like. In this method, a rubber composition obtained by compounding particular amounts of sulfur or an organic sulfur compound and aliphatic amine with an unvulcanized unsaturated rubber having a relatively small content of unsaturated double bond such as EPT, butyl rubber or the like is dissolved in an organic solvent, which is applied to surfaces of vulcanized rubber articles to be adhered. Then, the applied surfaces after the drying are stuck to each other and left to stand at a temperature of, for example, 40° C. However, this method has also the following problems:

(1) Since the thickness of the adhesion rubber layer is too small, it is difficult to obtain a large peeling strength;

(2) When using an adherend having many large and small uneven areas such as a retreading base tire or the like, it is difficult to uniformly apply the adhesive solution, so that the true adhered portion is not a plane form but is apt to be rendered into dot-like form.

Furthermore, a repair material for rubber tire called by the trade name of Tip-Top is commercialized by Stahl Gruber GMBH & Co. in West Germany. However, this material has a low peeling strength at a high temperature (100° C.) and a low peeling strength after the aging and is unsuitable for retreading adhesion of tires.

SUMMARY OF THE INVENTION

It is, therefore, an object of the invention to provide an adhesion method in which vulcanized rubbers are adhered to each other at a low temperature of not higher than 100° C., preferably not higher than 50° C. without requiring an investment of large size equipment such as autoclave vulcanization or the like to thereby prevent the degradation of properties and performances in the vulcanized rubber due to the repetition of high temperature treatment.

It is another object of the invention to obtain a large peeling strength at room temperature and high temperature (100° C.) and after the aging which has not been achieved in the conventional low temperature adhesion method.

According to the invention, the above another objects and advantages are obtained by a method of adhering vulcanized rubber articles, which comprises the steps of:

(I) applying a rubber cement composition, which comprises 100 parts by weight of natural rubber (NR) or isoprene rubber (IR), 1-5 parts by weight of sulfur or an organic sulfur compound having two or more sulfur atoms, 1-15 parts by weight of a ultrarapid accelerator, 2-15 parts by weight of an organic amine having a base dissociation constant ($pK_b$) of not more than 5, 30-70 parts by weight of carbon black and proper amounts of zinc white and organic solvent, to surfaces of the vulcanized rubbers to be adhered and drying it;

(II) sandwiching an unvulcanized rubber sheet of a cushion rubber composition, which comprises 100 parts by weight of natural rubber (NR) or isoprene rubber (IR), 1-5 parts by weight of sulfur, 1-7 parts by weight of an organic amine having a base dissociation constant ($pK_b$) of not more than 5, 30-70 parts by weight of carbon black and a proper amount of zinc white, between the applied surfaces of the vulcanized rubbers and vulcanizing them at a temperature of 0°-100° C. under pressure.

Thus, according to the invention, the low temperature adhesion becomes possible and of the adhesion rubber layer is thick and the adhesion state is not dot-like but is planar so that there can be obtained adhesion solid structures having high peeling strength at room temperature and 100° C and after aging.

DESCRIPTION OF THE PREFERRED EMBODIMENTS

Heretofore, rubber adhesion through vulcanization as in the retreading adhesion of tires or the like has been attained by sandwiching an unvulcanized cushion rubber sheet between the vulcanized rubbers and vulcanizing them at a temperature of not lower than 120° C., usually about 150° C. In this case, sulfur and the accelerator coexist in the cushion rubber sheet. The accelerator used is an accelerator for high temperature vulcanization such as a sulfeneamide series accelerator or the like, but the use of ultrarapid accelerators is impossible because it causes rubber scorching. In the vulcanizing adhesion, it is necessary that sulfur (or a sulfur containing vulcanization agent) and the accelerator contained in the cushion rubber sheet migrate into the vulcanized rubber. In this connection, since the vulcanization temperature is as high as not lower than 120° C. in the above conventional system, micromolecular motion of unsaturated rubber molecule, sulfur (or a sulfur containing vulcanization agent) and the accelerator is sufficiently caused, so that the necessary migration is attained only by the heating. However, when the vulcanization temperature is not higher than 100° C., particularly about 50° C., the requirements generating the vulcanization may be satisfied by using a ultrarapid accelerator, but the sufficient migration of the agent or the like is not attained due to the low temperature and consequently the desired vulcanizing adhesion could not be achieved. Now, it has been attempted according to a method described in Japanese Patent laid open No. 54-144485 that an unvulcanized rubber sheet containing a vulcanization agent and a rubber cement composition containing an ultrarapid accelerator are separately provided, and the rubber cement composition is applied to each surface of vulcanized rubber articles to be adhered and dried, and then the unvulcanized rubber sheet is sandwiched between the applied surfaces of these articles and vulcanized under pressure. In the latter method, however, satisfactory vulcanizing adhesion could not be obtained under conditions that the vulcanization temperature is not higher than 50° C. and the vulcanization time is not more than 24 hours (see Comparative Example 1 as mentioned later).

The inventors have made further studies and found out that when a proper organic amine is added to each of the above unvulcanized rubber sheet and the rubber cement composition, very satisfactory peeling strength can surprisingly be obtained even under low temperature vulcanization conditions as mentioned above.

In the invention, the rubber cement composition takes a very important role in that the ultrarapid accelerator is supplied into the unvulcanized rubber sheet by migration through the adhesion interface after the pressing to form an adhesion layer based on the uniting of the rubber cement composition itself with the unvulcanized rubber sheet and at the same time sulfur and the ultrarapid accelerator migrate further into the vulcanized rubber portion from the adhesion layer. Particularly, the organic amine contained in the rubber cement composition not only serves the migration of sulfur or the organic sulfur compound containing two or more sulfur atoms and the ultrarapid accelerator but also promotes the vulcanization reaction inside the adhesion layer and at the interface thereof together with the organic amine contained in the unvulcanized rubber sheet. In order to prevent the scorching induced by the use of the ultrarapid accelerator during the storing of the rubber cement composition, such a rubber cement composition is usually divided into the following two liquids and stored, and such two liquids are mixed just before the use. That is, one of the two liquids (liquid A) contains sulfur or the organic sulfur compound having two or more sulfur atoms and the organic amine, while the other liquid (liquid B) contains the ultrarapid accelerator. Each of the liquids A and B further contains proper amounts of natural rubber (NR) or isoprene rubber (IR), carbon black, zinc white and, if necessary, various additives (stearic acid, antioxidant, plasticizer and the like). The concentration in each of the liquids A and B is not particularly critical, but it is usually about 5-30% by volume from a viewpoint of the application and drying. Furthermore, as the organic solvent, use may be made of any solvents capable of dissolving the above rubber, among which solvents having a relatively low boiling point are favorable. That is, halogenated hydrocarbons such as methylene chloride, chloroform, trichloroethylene, tetrachloroethane and the like, aliphatic or alicyclic hydrocarbons or a mixture thereof such as pentane, hexane, cyclohexane, heptane, octane, rubber solvent and the like are suitably used. The amount of the organic solvent used in the rubber cement composition is not particularly critical, but it is convenient to be not more than about 1000 parts by weight per 100 parts by weight of the rubber component.

In the invention, the cushion rubber sheet and the applied rubber cement form an adhesion layer, so that the rubber thickness (i.e. rubber quantity) in the cushion rubber layer is considerably larger than that of the applied rubber cement layer. Therefore, the cushion rubber sheet has a very important role to (1) ensure a tackiness in the processing and (2) mainly enhance the strength of the adhesion layer after the vulcanization. In this case, the thickness of the cushion rubber layer is preferably not more than 2.0 mm, particularly not more than 1.5 mm in order to rapidly conduct the penetration and migration of the ultrarapid accelerator from the applied rubber cement layer as soon as possible.

According to the invention, the use of natural rubber or isoprene rubber is suitable as a rubber component forming the adhesion layer from a viewpoint of excellent processability and good rubber properties through the ultrarapid accelerator.

Examples of sulfur or organic sulfur compound having two or more sulfur atoms in molecule include elementary sulfur, and polysulfides such as tetramethylthiuram disulfide, tetramethylthiuram tetrasulfide, disulfide of alkylphenol and so on. They are used in an amount of 1-5 parts by weight per 100 parts by weight of the rubber component as a sulfur donor. When the amount is less than 1 part by weight, the vulcanization rate in the adhered portion is insufficient, while when it exceeds 5 parts by weight, the rubber properties of the adhesion layer lower.

Examples of the ultrarapid accelerator include piperidine salt of pentamethylene dithiocarbamic acid, pipecolate of pipecolyldithio carbamic acid, dithiocarbamate such as zinc N-ethyl dithiocarbamate, zinc N-phenyl dithiocarbamate and the like, xanthates such as zinc butylxanthate, zinc isopropylxanthate and the like, and a mixture thereof. The ultrarapid accelerator is used in an amount of 1-15 parts by weight per 100 parts by weight of the rubber component. When the amount is less than 1 part by weight, the vulcanization rate in the adhered portion and adhesion layer is insufficient, while when it exceeds 15 parts by weight, the rubber properties in the adhered portion and adhesion layer are lowered.

As the organic amine used in the invention, mention may be made of amines having $pK_b \leq 5$ such as n-butylamine, cyclohexylamine, n-octylamine, di-n-butylamine, morpholine, N-ethyl cyclohexylamine, triethylamine, tri-n-butylamine, diazabicyclooctane and the like. One effect sought by the present invention is first developed by using such an amine. This effect can not be obtained when using an amine of $pK_b > 5$ such as aniline ($pK_b = 9.40$), N-methylaniline ($pK_b = 9.15$), dimethylaniline ($pK_b = 8.85$) or the like.

The amount of the Organic amine used per 100 parts by weight of the rubber component is 2-15 parts by weight in the case of the rubber cement composition and 1-7 parts by weight in the case of the cushion rubber sheet. In the rubber cement composition, when the amount is less than 2 parts by weight, the vulcanization rate in the adhered portion and adhesion layer is insufficient, while when it exceeds 15 parts by weight, the rubber properties in the adhered portion and adhesion layer are lowered. In the case of the cushion rubber sheet, when the amount is less than 1 part by weight, the vulcanization rate in the adhesion layer lowers, while when it exceeds 7 parts by weight, the rubber properties in the adhered portion and adhesion layer are lowered.

The carbon black should be selected in accordance with the use purpose of the rubber articles as an adherend. In general, the use of carbon black having a low pH delaying the vulcanization rate is avoided, and the use of carbon blacks having pH of about 6-8 is favorable. The amount of carbon black used is 30-70 parts by weight considering the properties after vulcanization such as strength of adhesion layer and the like.

Furthermore, zinc white is compounded in a proper amount, usually not more than 10 parts by weight per 100 parts by weight of the rubber component. If necessary, not more than 10 parts by weight of stearic acid, not more than 100 parts by weight of process oil for general rubber industry and a softening agent and the like may be included per 100 parts by weight of the rubber component.

The following examples are given to illustrate the invention and are not intended as limitations thereof.

EXAMPLE 1

Liquid A, liquid B and cushion rubber sheet (thickness: 0.5 mm) were provided according to a compounding recipe shown in the following Table 1.

TABLE 1

| Compounding recipe (parts by weight) | Liquid A | Liquid B | Cushion rubber |
|---|---|---|---|
| isoprene rubber *1 | 100 | — | 100 |
| carbon black HAF | 40 | — | 40 |
| active zinc white | 5 | — | 5 |
| stearic acid | 1 | — | 1 |
| sulfur | 3 | — | 2 |
| aromatic oil | 10 | — | 10 |
| ultrarapid accelerator PPD *2 | — | 5.5 | — |
| ultrarapid accelerator ZBX *3 | — | 5.5 | — |
| N-ethyl cyclohexylamine | 10 | — | 3 |
| rubber solvent | 700 | 700 | — |

*1 IR 2200 (polyisoprene made by Japan Synthetic Rubber Co., Ltd.)
*2 piperidine salt of pentamethylene dithiocarbamic acid (made by Ouchi Shinko K.K.)
*3 zinc butylxanthate (made by Ouchi Shinko K.K.)

The liquids A and B were mixed at an equal volume before the use, which was applied onto each surface of two carbon-reinforced and vulcanized natural rubber sheets (thickness: 2 mm) to be adhered and then dried. Next, the unvulcanized cushion rubber sheet was sandwiched between the two applied surfaces, which was vulcanized at 50° C. under a surface pressure of 3.3 kgf/cm² for 24 hours. The thus obtained test sample exhibited the following adhesion performances by a peeling test. Moreover, the heat aging was carried out in an atmosphere of N₂ gas at 100° C. for 48 hours.

| Peeling strength | |
|---|---|
| (25° C.) | 95 kg/2.54 cm |
| (100° C.) | 86 kg/2.54 cm |
| Peeling strength after heat aging | |
| (25° C.) | 69 kg/2.54 cm |

In any case, the test sample shows excellent adhesion performances owing to rubber fracture.

EXAMPLE 2

A test sample was prepared by the same method as in Example 1 except that triethylamine was used instead of N-ethyl cyclohexylamine in the liquid A and the cushion rubber sheet. In this case, the peeling strength at 100° C. was 78 kg/2.54 cm and rubber fracture was caused.

COMPARATIVE EXAMPLE 1

The same procedure as in Example 1 was repeated without the addition of the organic amine to prepare a test sample. In this case, the peeling strength at 25° C. was 5 kg/2.54 cm and the peeling strength at 100° C. was 1 kg/2.54 cm and interface fracture was caused.

COMPARATIVE EXAMPLE 2

There was provided an unvulcanized rubber sheet (thickness 0.5 mm) according to the usual rubber compounding recipe shown in the following Table 2. This sheet was sandwiched between two vulcanized rubber sheets and heated under pressure according to Example 1 to prepare a test sample. As a result of the peeling test, the vulcanized rubber sheets were not adhered in this sample.

TABLE 2

| isoprene rubber *1 | 100 | (part by weight) |
|---|---|---|
| carbon black HAF | 50 | " |
| aromatic oil | 10 | " |
| zinc white | 3 | " |
| petroleum resin | 5 | " |
| stearic acid | 1 | " |
| accelerator *2 | 1.5 | " |
| sulfur | 2.0 | " |

*1 IR 2200 (made by Japan Synthetic Rubber Co., Ltd.)
*2 sulfeneamide series

COMPARATIVE EXAMPLE 3

An adhesion liquid having a compounding receipe shown in the following Table 3 according to Example of Japanese Patent Application Publication No. 49-24972 was provided. This adhesion liquid was applied to the two vulcanized rubber sheets and dried, and then the two applied surfaces were piled one upon the other and heated under pressure according to Example 1 to prepare a test sample. As a result of the peeling test, the two sheets were not adhered.

TABLE 3

| butyl rubber *1 | 100 | (part by weight) |
|---|---|---|
| zinc white | 5 | " |
| titanium white | 10 | " |
| petroleum resin | 20 | " |
| ultrarapid accelerator PZ *2 | 2 | " |
| triethylene tetramine | 10 | " |
| sulfur | 10 | " |
| toluene | 720 | " |

*1 made by Nippon Buchiru K.K.
*2 zinc dimethyldithio carbamate (made by Ouchi Shinko K.K.)

COMPARATIVE EXAMPLE 4

As a commercially available adhesive of room temperature type for vulcanized rubber, Tip-Top, a trade name, made by Stahl Gruber GMBH & Co. was examined. This adhesive consisted of a rubber cement solution and a cushion rubber sheet. After the rubber cement solution was applied to the two vulcanized rubber sheets and dried according to Example 1, the cushion rubber sheet was sandwiched between the two applied surfaces and heated under pressure (30° C.×24 hours) to prepare a test sample. The peeling test was made with respect to this sample to obtain the following results. Moreover, the heat aging was carried out in an atmosphere of N₂ gas at 100° C. for 48 hours.

| Peeling strength | |
|---|---|
| (25° C.) | 49 kg/2.54 cm |
| (100° C.) | 38 kg/2.54 cm |
| Peeling strength after heat aging | |
| (25° C.) | 18 kg/2.54 cm |

In any case, the test sample did not cause rubber fracture but caused interface fracture, which shows that the method according to the invention is excellent.

As seen from the above examples and comparative examples, in the adhesion method according to the invention, the adhesion between vulcanized rubbers at a temperature of not higher than 100° C., usually not higher than 50° C., can be carried out by somewhat adding practicable change to the material as compared with the conventional high temperature vulcanization system used in the retreading adhesion of tires, whereby large peeling strength at room temperature and high temperature (100° C.) and good peeling strength after the heat aging, which have never been achieved in the conventional low temperature adhesion method, can be obtained.

As a result, according to the invention, the investment of large size equipment such as autoclave vulcanization or the like is not required for the vulcanization, and also degrading properties and poor performance of vulcanized rubbers adhered due to the exposure to high temperature can be reduced or prevented. Therefore, the adhesion method according to the invention imparts an improved effect in the retreading adhesion of tires, repairing the broken-off portion in tires, conveyor belts or the like, and forming numerous conveyor belts and the like as compared with the conventional methods.

What is claimed is:

1. A method of adhering vulcanized rubber articles, which comprises the steps of:

(I) applying a rubber cement composition, which comprises 100 parts by weight of natural rubber or isoprene rubber, 1-5 parts by weight of sulfur or an organic sulfur compound having two or more sulfur atoms, 1-15 parts by weight of an ultrarapid accelerator, 2-15 parts by weight of an organic amine having a base dissociation constant of not more than 5, 30-70 parts by weight of carbon black and proper amounts of zinc white and organic solvent, to surfaces of the vulcanized rubber articles to be adhered and drying it;

(II) sandwiching an unvulcanized rubber sheet of a cushion rubber composition, which comprises 100 parts by weight of natural rubber or isoprene rubber, 1-5 parts by weight of sulfur, 1-7 parts by weight of an organic amine having a base dissociation constant of not more than 5, 30-70 parts by weight of carbon black and a proper amount of zinc white, between the cement coated surfaces of the vulcanized rubber articles and vulcanizing the assembly so formed at a temperature of 0-100° C. under pressure.

2. The method according to claim 1, wherein said rubber cement composition is divided into a liquid containing said sulfur or organic sulfur compound and said organic amine and a liquid containing said ultrarapid accelerator and stored before use.

3. The method according to claim 1, wherein said organic sulfur compound is selected from tetramethylthiuram disulfide, tetramethylthiuram tetrasulfide and disulfide of alkylphenol.

4. The method according to claim 1, wherein said ultrarapid accelerator is selected from piperidine salt of pentamethylene dithiocarbamic acid, pipecolate of pipecolyldithio carbamic acid, zinc N-ethyl dithiocarbamate, zinc N-phenyl dithiocarbamate, zinc butylxanthate, zinc isopropylxanthate and a mixture thereof.

5. The method according to claim 1, wherein said organic amine is selected from n-butylamine, cyclohexylamine, n-octylamine, di-n-butylamine, morpholine, N-ethyl cyclohexylamine, triethylamine, tri-n-butylamine and diazabicyclooctane.

* * * * *